(12) United States Patent
Becker et al.

(10) Patent No.: US 9,108,538 B2
(45) Date of Patent: Aug. 18, 2015

(54) UNDER-FRAME FOR A MOTOR VEHICLE SEAT

(75) Inventors: Burckhard Becker, Solingen (DE);
Wilfried Beneker, Solingen (DE)

(73) Assignees: HYUNDAI MOTOR COMPANY,
Seoul (KR); **C. ROB.
HAMMERSTEIN GMBH & CO. KG**,
Solingen (DE)

( * ) Notice: Subject to any disclaimer, the term of this patent is extended or adjusted under 35 U.S.C. 154(b) by 578 days.

(21) Appl. No.: 13/417,875

(22) Filed: Mar. 12, 2012

(65) Prior Publication Data

US 2012/0248840 A1    Oct. 4, 2012

(30) Foreign Application Priority Data

Mar. 29, 2011 (DE) .................... 10 2011 001 638

(51) Int. Cl.
*A47C 1/00* (2006.01)
*B60N 2/16* (2006.01)
*B60N 2/04* (2006.01)

(52) U.S. Cl.
CPC .............. *B60N 2/1615* (2013.01); *B60N 2/045* (2013.01); *B60N 2/165* (2013.01); *B60N 2/167* (2013.01); *B60N 2/168* (2013.01); *B60N 2/1675* (2013.01)

(58) Field of Classification Search
CPC .................................................. B60N 2/045
USPC ....................................... 297/344.15, 344.14
See application file for complete search history.

(56) References Cited

U.S. PATENT DOCUMENTS

| 4,128,225 | A  | * | 12/1978 | Kluting et al. ............... 248/421 |
| 6,290,198 | B1 | * | 9/2001 | Kojima et al. ............... 248/422 |
| 6,425,557 | B1 | * | 7/2002 | Becker et al. ............... 248/157 |
| 6,533,351 | B2 |   | 3/2003 | Deptolla |
| 7,066,540 | B2 | * | 6/2006 | Minai et al. .............. 297/344.15 |

(Continued)

FOREIGN PATENT DOCUMENTS

| CN | 101456365 A | 6/2009 |
| DE | 100 28 897 A1 | 12/2001 |

(Continued)

*Primary Examiner* — Laurie Cranmer
(74) *Attorney, Agent, or Firm* — Morgan, Lewis & Bockius LLP

(57) ABSTRACT

An under-frame apparatus for a motor vehicle seat may include a basic body, a seat frame adjustable with respect to the basic body between an utmost rear and front positions, a pair of front and rear vibration levers joint-connected to the basic body and the seat frame, respectively, an adjustment arm joint-connected one of the front and rear vibration levers and including a saw teeth engagement part on a free end region thereof, an adjustment device rotatably coupled to the seat frame and engaged to the free end region to adjust a position of the seat frame with respect to the basic body, wherein the adjustment device includes a pinion gear engaged to the adjustment arm and driven by an operation unit, and an elastic member attached to the seat frame and applying a restoring force to the seat frame toward a starting position.

10 Claims, 3 Drawing Sheets

(56) References Cited

U.S. PATENT DOCUMENTS

| | | | |
|---|---|---|---|
| 7,278,686 B2* | 10/2007 | Yoshida | 297/338 |
| 7,828,384 B2* | 11/2010 | Shinozaki | 297/344.15 |
| 7,861,994 B2* | 1/2011 | Yamada et al. | 248/421 |
| 7,984,950 B2* | 7/2011 | Hoshi et al. | 297/344.12 |
| 8,177,280 B2* | 5/2012 | Yamada et al. | 296/65.05 |
| 8,366,194 B2* | 2/2013 | Yamamoto | 297/284.11 |
| 8,590,971 B2* | 11/2013 | Ito et al. | 297/344.15 |
| 8,616,645 B2* | 12/2013 | Ito | 297/344.17 |
| 8,764,111 B2* | 7/2014 | Foelster et al. | 297/344.17 |
| 2006/0001306 A1* | 1/2006 | Becker et al. | 297/344.15 |
| 2006/0061176 A1* | 3/2006 | Sakai et al. | 297/344.15 |
| 2007/0216210 A1* | 9/2007 | Kim et al. | 297/344.15 |
| 2009/0261224 A1 | 10/2009 | Yamada et al. | |
| 2010/0001569 A1* | 1/2010 | Shinozaki | 297/344.15 |

FOREIGN PATENT DOCUMENTS

| | | |
|---|---|---|
| EP | 1 190 891 B1 | 3/2008 |
| JP | 9-30300 A | 2/1997 |
| JP | 2567377 Y2 | 12/1997 |
| JP | 2007-112393 A | 5/2007 |
| JP | 2008-24014 A | 2/2008 |
| JP | 2010-285047 A | 12/2010 |
| KR | 10-2009-0015452 A | 2/2009 |
| KR | 10-2009-0047950 A | 5/2009 |

* cited by examiner

UNDER-FRAME FOR A MOTOR VEHICLE SEAT

CROSS-REFERENCE TO RELATED APPLICATION

The present application claims priority to German Patent Application No. 10 2011 001 638.4 filed on Mar. 29, 2011, the entire contents of which is incorporated herein for all purposes by this reference.

BACKGROUND

1. Field of the Invention

The present invention relates to a under-frame for a motor vehicle seat wherein the under-frame for a motor vehicle seat includes a basic body connectable to a vehicle floor, a seat frame adjustable relatively with respect to the basic body between an utmost front position and an utmost rear position, a pair of front and rear vibration levers jointed-connected to the basic body and the seat frame, respectively, an adjustment arm joint-connected to one of the pair of vibration levers and including a saw engagement part on its free end region, an adjustment device connected to the adjustment arm on the free end region for adjusting the seat frame with respect to the basic body, and a spring member for applying compression stress to the seat frame toward a starting direction.

2. Description of Related Art

The under-frame for a motor vehicle seat has been proposed as various embodiments, and in these cases, according to the exemplary embodiments, the under-frame allows many adjustment possibilities of the motor vehicle seat position to a user with optimized-application. The adjustment possibilities are accomplished by the constitutional unit of the vehicle seat, which are relatively adjustable to each other, or the constitutional units of the under-frame for a motor vehicle wherein in this case the constitutional units are moved manually, or by a motor.

Due to the many adjustment possibilities, the under-frame is often formed complicatedly, which causes a high material cost of the motor vehicle seat and a high manufacturing cost thereof. However, there increases a demand of an economical, light and simply configured motor vehicle seat to a vehicle manufacturer for supplying a specially low price vehicle at the manufacturer side, and in this case a comfortable feeling with respect to the adjustment possibility of the motor vehicle seat may be damaged. however, for example, a basic adjustment possibility such as a seat length application to the individual user has to conveniently ensured. This object relates to the position of the adjustable seat and also an operational possibility thereof.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an under-frame for a motor vehicle seat capable of being manufactured economically, simply and reliably.

The object of the present invention is achieved by the under-frame for a motor vehicle seat. The preferred improved examples are described in dependent claims of the present invention. The features of the under-frame for a motor vehicle seat, are configured such that a pinion gear is provided, which is connected to an adjustment device for changing the position of the adjustment arm which is used for adjusting the seat frame position with respect to the basic body between the utmost front position and the utmost rear position, and is driven by an operation unit, and a torsion bar spring to which a spring member for applying a compression stress to the seat frame toward a starting position is fixed practically without gap is provided.

Even though the basic body may be fundamentally connected movable to a vehicle floor, in the under frame according to an exemplary embodiment of the present invention, the basic body preferably may be fixedly connected to the vehicle floor. At this time, the adjustment of the seat frame for fixing a user's seat is caused only from position changing of the seat frame with respect to the basic body. In an exemplary embodiment of the present invention, there is a possibility of adjusting the basic body between the utmost rear position and the utmost front position through an integrated connection of the seat frame to the basic body made by a pair of front and rear vibration levers, and as a result it is possible of changing a height of the seat frame while setting a length position of the seat frame. Accordingly, a possibility of excellently applying the seat frame to a requested position by a user is achieved and for this result a complementary length setting is not necessary.

The vibration lever in an exemplary embodiment of the present invention may be shaped such that a height position obtained through the vibration lever when changing the seat frame position corresponds to a user's request existing generally for individual length position. In this case, the utmost front position does not need to correspond to the highest position. Accordingly, the utmost front position may be arranged on a point exceeding to a high point selected by a rotation possibility of the vibration lever.

A seat position with respect to the basic body, in other words, for adjusting the seat frame one vibration lever, preferably, the rear vibration lever is joint-connected to the adjustment arm and further the free end of the adjustment arm placed at an opposite location to a link point with the vibration lever may be connected to the pinion gear of the adjustment device through a saw teeth engagement section. The pinion gear driven manually or through a motor allows the seat frame position to be changed with respect to the basic body through a proper mechanical device, and in this case the adjusted position may be ideally fixed through an automatic stopping device or a locking means provided depending on a circumference.

Specially, when the pinion gear is driven manually, a torsion bar spring fixed thereto practically without a gap may be used for supporting an adjustment motion through, for example, a rotation wheel, and the torsion bar spring applies a compression stress to the seat frame toward a starting position. At this time, the starting position is a basically random seat frame position which is selected within an assembling frame of the under frame and exists between the utmost rear position and the utmost front position wherein in this case the utmost rear position and the utmost front position may be the starting position. Through the compression stress applied by the torsion bar spring—in this case, there is practically no gap in the spring member, in other words, there is only usual tolerance or a deviation exceeding a little to the tolerance-, the spring member supports the seat frame adjustment motion and thus the seat frame position changing toward the starting position is adjusted conveniently.

A user may adjust the seat position proper for himself/ herself from the starting position in a very simple manner, and at this time convenient operation is possible specially when the starting position is arranged departing from the utmost rear position, since in this case the upward motion of the seat frame caused from the rotation motion of the vibration lever from the utmost rear position toward the utmost front position within an adjustment frame is supported.

Accordingly, the under frame according the present invention, when the basic body is preferably fixed integratedly to a vehicle floor, the under frame can be manufactured economically and simply by using a very small number of constitutional elements and at the same time a convenient length adjustment of the seat frame and an application thereof to individual user's request are possible. At this time, the torsion bar spring provided according to an exemplary embodiment of the present invention supports the adjustment motion of the seat frame made toward the starting position to be decided within a structure or assembly frame.

An operation of the pinion gear for adjusting the seat frame with respect to the basic body may be selected freely. Accordingly, as described in the forgoing, the pinion gear may be formed for manually driving the operation members and driving the driving unit with a motor, and in this case, a coupling to the pinion gear may be made at random manner. However, according to the exemplary embodiment of the present invention, the pinion gear may be driven through a driving shaft provided for arranging the operation unit. Preferably, by using a standard driving shaft, the sear frame can be used in different embodiments, in other words, the standard driving shaft can be used for the operation unit to be driven through a motor and also for the operation unit to be driven manually. As a result, correspondingly improved under frame may be varied variously to form the under frame for the different comfortable feeling embodiments, and in this case, the standard driving shaft allows the operation unit to be selected simply.

The exemplary embodiment for forming the operation unit as a motor-type driving unit and also a manually driving unit may be selected freely, and at this time, according to a exemplary embodiment of the present invention, in a case of the motor-type driving unit, the driving unit is formed with a gear attached motor, and in case of the manually driving device, the driving device is formed with an operation lever connected thereto through a clamping roller free running. By using the gear attached motor, a specially precise adjustment of the seat frame with respect to the basic body is possible, and as a result, a desired seat position is fixed precisely. Preferably, by using the operation lever connected through the clamping roller free running, a comfortable operation is possible, and in this case, the operation lever has to be operated once or several times by receiving the support from the clamping roller running depending on the desired operation direction of the seat frame with respect to the basic body. At this time, the clamping roller running ensures that the operation lever is to be arranged to the previously selected starting position after finishing the adjustment motion.

A join-connection point between one of the front and the rear vibration levers and the adjustment arm may be selected freely. However, according to a more exemplary embodiment of the present invention, the adjustment arm is connected to the vibration lever at a region where the front or the rear vibration lever is joint-connected to the basic body. According to the present embodiment in which the joint-connection point of the adjustment arm is arranged adjacent to the joint-connection point of the basic body and the vibration lever, a specially excellent stepped-adjustment of the seat frame is possible, and as a result, a user can easily set the seat position comfortable to himself/herself. Furthermore, the integrated connection of the adjustment arm as described in the forgoing can make the adjustment arm to be compact and short length.

The basic body may be formed at a random manner and in this case, the basic body may be, for example, formed as a continuous plate. However, according to a more exemplary embodiment of the present invention, the basic body includes two side members which are arranged each other at a predetermine distance wherein the two side members are connected each other by a basic body cross arm. According to the exemplary embodiment of the present invention, the under frame is connected to a vehicle floor through the side members forming the basic body. At this time, in order to ensure a sufficient safety of the basic body, specially, in order to ensure a relative positioning of the side members, the side members are connected through at least one basic body cross arms. The correspondingly formed basic body is light-weighted and at the same time a sufficient safety is featured and further ensures to manufacture the light-weighted under frame in a very reliable manner.

As long as the seat frame can be connected integratedly to the basic body through two vibration levers, the seat frame, likewise the basic body, may be formed in a random manner. However, according to a more preferable embodiment of the present invention, the seat frame includes two seat frame side parts which are arranged to each other at a predetermined distance wherein the two seat frame side parts are connected to each other through at least one seat frame cross arms. In the exemplary embodiment of the seat frame, the seat frame can be formed very simply and economically as a light-weighted configuration. At this time, a safety for the seat frame, in special, a collision safety is ensured through the at least one seat frame cross arms which sets the relative position of the seat frame side parts.

The joint-type integrated connection of the front and/or the rear vibration lever with respect to the basic body and the seat frame may be made in a random manner depending on an existing arrangement space and a necessary adjustment possibility. When the basic body provided with two side members arranged to each other at a predetermined distance and/or the seat frame provided with two seat framed side parts arranged to each other at a predetermined distance are formed according to the preferred embodiment, the front and/or the rear vibration lever is joint-connected to the basic body cross arm and/or the seat frame cross arm, according to the exemplary embodiment of the present invention. The correspondingly integrated connection of the vibration lever avoids additional weakening of the seat frame side part or the side member and at this time in case of the more exemplary embodiment of the seat frame cross arm having a circular cross-sectional area and/or the basic body, the joint-connection may be implemented simply and economically.

According to a exemplary embodiment of the present invention, the front and/or the rear vibration lever are connected to each other through one support cross arm. Basically, the connection through the support cross arm, which can be made, regardless of the selected joint-connection of the vibration lever with respect the basic body and the seat frame, increases a safety of the under frame in a supplementary manner, and in this case, the collision safety specially is increased by the relative support action of the vibration lever through the support cross arm, and as a result a collapse possibility of the under frame is avoided prominently.

With respect to an arrangement of the torsion bar spring for fixing the starting position where the seat frame starts to move by receiving a compression stress from the torsion bar spring, one end of the torsion bar spring is fixed to the seat frame side part and the other end thereof is fixed to the seat frame cross arm, according to a preferred and improved embodiment of the present invention. According to the present embodiment, the torsion bar spring can be arranged simply to save a space, and as a result, the starting position of the seat frame with respect to the basic body is to be fixed in reliable manner. Further, in the arrangement state of the torsion bar spring as described in the forgoing-when the torsion bar spring has to be connected to the seat frame side part and the seat frame cross arm having practically no gap at the starting position which is selected only while not receiving a load-a fixing of the starting position to be selected freely is possible.

In special, according to a exemplary embodiment of the present invention, the torsion bar spring applies a compression stress to the seat frame toward the starting position where the rear vibration lever progresses at a right angle with respect to the basic body. In an exemplary embodiment of the correspondingly under frame, the torsion bar spring is released at a vertical position to the rear vibration lever, and when the seat frame is moved forward, starting from the starting position, the rear vibration lever departs from its vertical location and is directed forward to a progressing direction at an installation position of the under frame, and the torsion bar spring causes a power reward to a vehicle direction. When the seat frame is moved rearward, the rear vibration lever departs from its vertical position and is directed rearward to a progressing direction and the torsion bar spring causes a power forward to a vehicle direction.

An arrangement of the torsion bar spring with respect to the seat frame cross arm may be made in a random manner, and in one embodiment of forming the seat frame cross arm as a lateral tube, the seat frame cross arm may be arranged inside the lateral tube to save a space. Fundamentally, a supporting state without a gap, which is used for avoiding noise produced when an adjustment is made, can be made simply and economically in the present embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
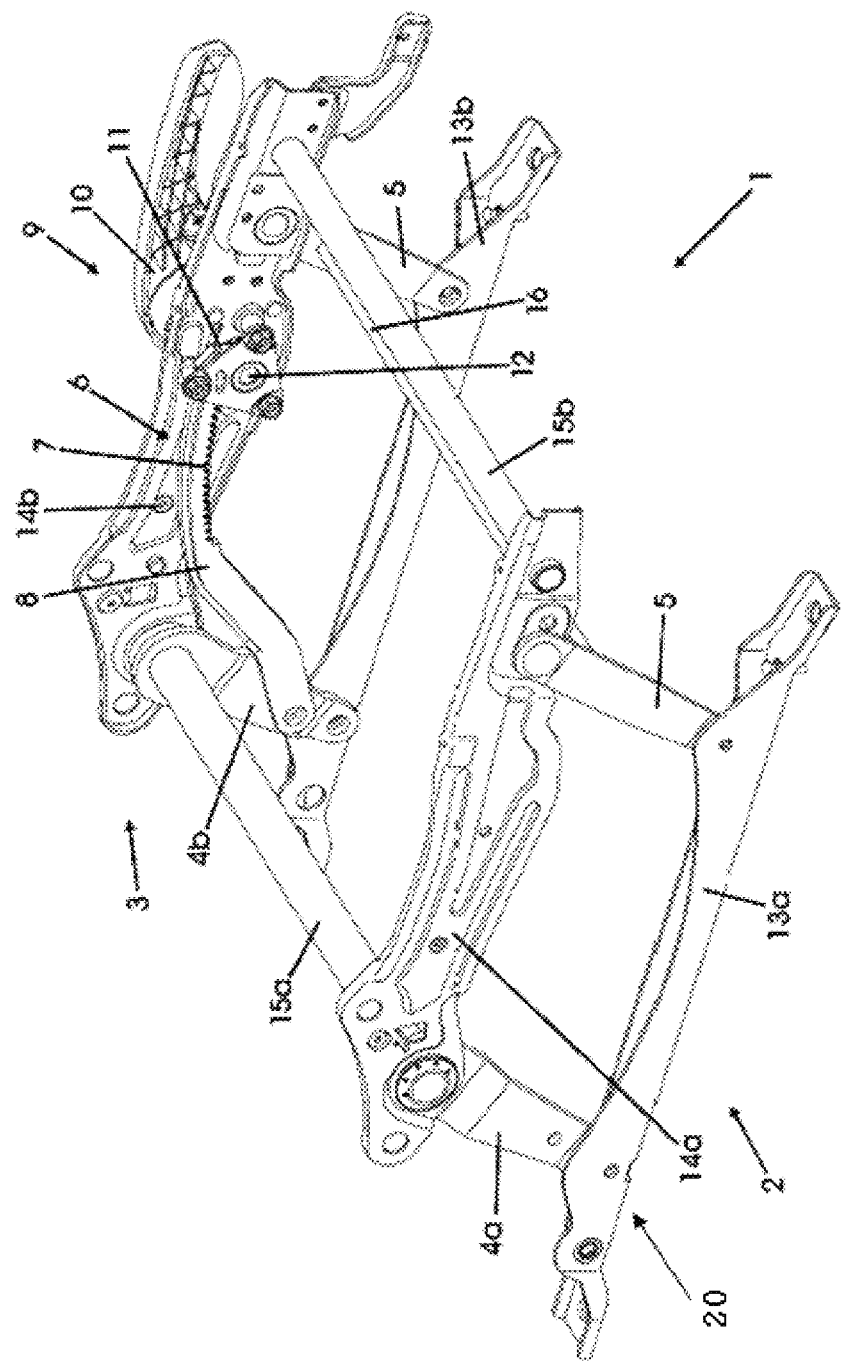
FIG. 1 is a perspective view showing a seat frame at an utmost front position.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter reference will now be made in detail to various embodiments of the present invention, examples of which are illustrated in the accompanying drawings and described below.

An under-frame 1 for a motor vehicle seat as shown in FIG. 1 may include a basic body 2 and the under frame 1 may be fixed firmly to a vehicle floor by the basic body. At this time, the basic body 2 may be formed with two side members 13a, 13b of a rail type and the two side members may be screw-connected to the vehicle floor by using a fixing device. The basic body 2 may be formed by two vibration lever pairs and further the vibration lever pair may be formed by two rear vibration levers 4a, 4b and two front vibration levers 5 one end of which is joint-connected to the side members 13a, 13b, and the other end of which is joint-connected to the seat frame 3 wherein the seat frame may be used to fix a seat face The seat frame 3 may be formed by two seat frame side parts 14a, 14b fixed relatively to each other through two seat frame cross arms 15a, 15b. In order to joint-integrated connect the seat frame 3 to the basic body 2 the rear vibration levers 4a, 4b is joint-connected to the rear seat frame cross arm 15a of a tube type, and in this case, the rear seat frame cross arm 15a is extended to inside the rear vibration levers 4a, 4b through a bore. The front vibration lever 5 is joint-connected to the seat frame side parts 14a, 14b, and in this case, the front vibration levers 5 are connected to each other through a support cross arm 16 extending therebetween in order to increase stability.

Figure 2:
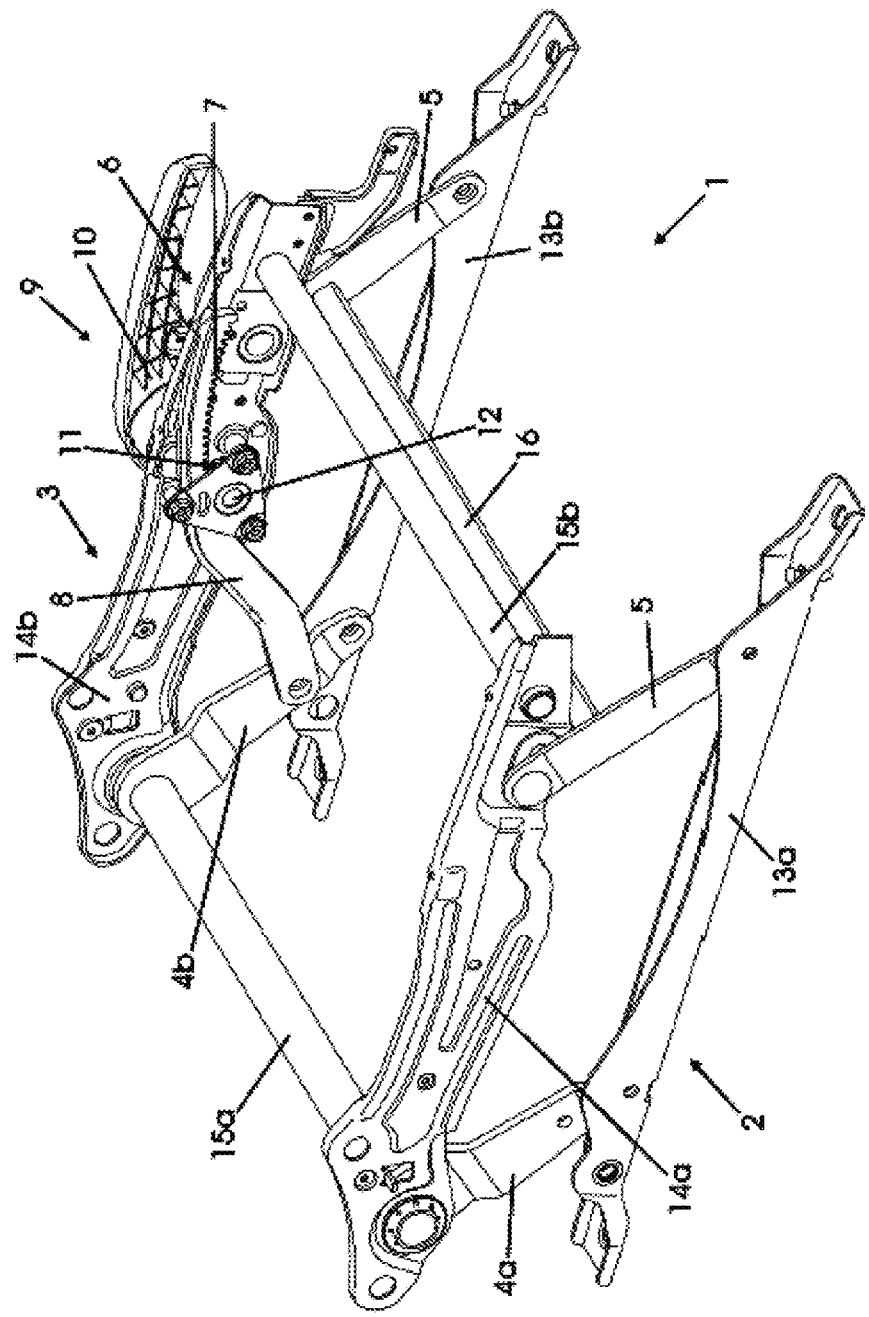
FIG. 2 is a perspective view showing the seat frame as shown in FIG. 1 at an utmost rear position.

An adjustment arm 8 may be used to adjust the seat frame 3 between the utmost front position as shown in FIG. 1 and the utmost rear position as shown in FIG. 2 wherein one end of the adjustment arm may be joint-connected to the rear vibration lever 4b and a free end 6 of the adjustment arm placed on an opposite side of the joint-connection point may be connected to a pinion gear 11 of an adjustment device 9 through a saw teeth engagement portion 7. The pinion gear 11 may be supported rotatively on the seat frame side part 14b and may be rotated to a desired adjustment direction through an operation unit which is formed as a lever 10 and placed on a driving shaft 12 of the pinion gear 11. At this time, the operation lever 10 is connected the driving shaft of the pinion gear 11 through a clamping roller 17 free running and thus it is possible for the desired seat position to be adjusted conveniently.

Figure 3:
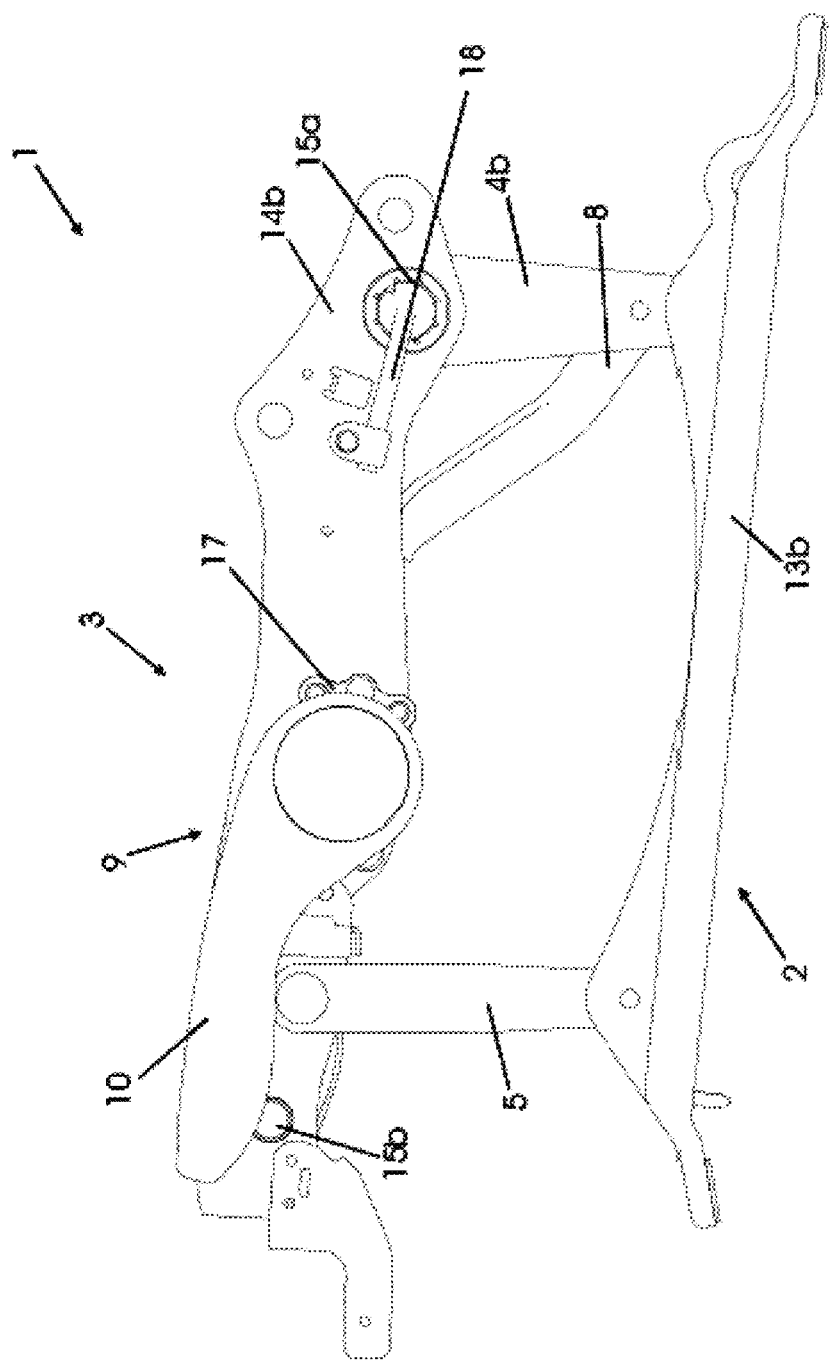
FIG. 3 is a side view showing the seat frame shown in FIG. 1, provided with a vibration lever progressing practically at an uptight angle with respect to a basic body.

In order to increase an adjustment comfortable feeling a torsion bar spring 18 may be used wherein a side of the torsion bar spring is fixed to an inner part of the seat frame cross arm 15a formed as a tube and the other side thereof is fixed to the seat frame side part 14b without a gap. A starting position where a compression stress is not applied from the torsion bar spring 18 is shown in FIG. 3, and at this position the rear vibration levers 4a, 4b progress at an right angle with respect to the basic body 2. An adjustment of the seat frame 3 with respect to the basic body 2 is started from the starting position and is to made frontward and also rearward, and in this case, the seat frame 3 is moved front-downward or rear-downward.

The integrated connection shape of the seat frame with respect to the basic body and an adjustment region therefrom of the seat frame with respect to the basic body may be fundamentally formed in a random manner. However, according to a exemplary embodiment of the present invention, the rear vibration lever can be rotated to the respective rotation direction till 75°, preferably 70°, more preferably 65°, with respect to the starting position. In special, when the starting position is fixed to a vertical position of the rear vibration lever, the previously provided rotation possibility of the rear vibration lever allows the under frame to be adjusted widely to provide excellent application possibility with respect to the request demanded by a user.

Basically, a safety belt forming a common fixing system to the vehicle seat may be arranged with respect to the under frame in a random manner. However, according to a exemplary embodiment of the present invention, a receiving member 20 is arranged so that a safety belt is indirectly or directly and releasably or unreleasably fixed to one of side members and/or one of vibration levers.

Since the safety belt is fixed releasably or unreleasably to the under frame according to an exemplary embodiment of the present invention, excellently operated fixing system may be formed. Accordingly, the receiving member which is selected freely may be formed by, for example, a belt locking device arranged on one side part or one vibration lever, and the belt locking device allows the safety belt to be connected indirectly and releasably. In an additional embodiment, the receiving member may be formed, for example, by a proper rivet connection and by the rivet connection the safety belt may be connected directly and unreleasably to the under frame at its end region.

An arrangement way and the numbers of the receiving member may be selected freely, corresponding to the manufacturing rules, and in this case it may be considered that two receiving members are arranged on the faced side members or on an adjacent vibration lever of one vibration lever pair, specially on the rear vibration lever. When the receiving member is arranged on one vibration lever, the receiving member is fixed to a lower portion of the vibration lever. According to the exemplary embodiment of the present invention, one receiving member is fixed to the rear vibration lever-to a lower portion of the vibration lever-, and another receiving member is fixed to one side member, and in this case, the kinds of the receiving member to be arranged may be selected freely.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An under-frame apparatus for a motor vehicle seat including:
   a basic body;
   a seat frame adjustable relatively with respect to the basic body between an utmost rear position and an utmost front position;
   a pair of front and rear vibration levers joint-connected to the basic body and the seat frame, respectively;
   an adjustment arm joint-connected one of the front and rear vibration levers and including a saw teeth engagement part on a free end region thereof;
   an adjustment device rotatably coupled to the seat frame and engaged to the free end region of the adjustment arm so as to adjust a position of the seat frame with respect to the basic body, wherein the adjustment device includes a pinion gear engaged to the adjustment arm and driven by an operation unit; and
   an elastic member attached to the seat frame and applying a restoring force to the seat frame toward a starting position,
   wherein the operation unit includes an operation lever coupled to a clamping roller,
   wherein the elastic member is a torsion bar spring fixed to a seat frame cross arm and a seat frame side part, and
   wherein the torsion bar spring applies the restoring force to the seat frame toward the starting position such that the rear vibration levers progress upwards with respect to the basic body.

2. The under-frame apparatus for the motor vehicle seat of claim 1, wherein the pinion gear is driven by a driving shaft attached to the pinion gear, the driving shaft being coupled to the operation unit.

3. The under-frame apparatus for the motor vehicle seat of claim 1, wherein the driving shaft has a connection region for arranging the operation unit.

4. The under-frame apparatus for the motor vehicle seat of claim 1, wherein the adjustment arm is connected to the one of the front or rear vibration levers between first and second connections of the one of the front or rear vibration levers to the basic body.

5. The under-frame apparatus for the motor vehicle seat of claim 1, wherein the basic body includes two side members arranged to each other at a predetermined distance and the two side members are connected to each other through at least one seat frame cross arm.

6. The under-frame apparatus for the motor vehicle seat of claim 5, wherein a receiving member is arranged for fixing a belt to one of side members and/or one of front and rear vibration levers.

7. The under-frame apparatus for the motor vehicle seat of claim 1, wherein the seat frame includes two seat frame side parts arranged to each other at a predetermined distance and the two seat frames side parts are connected to each other through at least one seat frame cross arm.

8. The under-frame apparatus for the motor vehicle seat of claim 7, wherein the front and rear vibration arms are joint-connected to at least two seat frame cross arms.

9. The under-frame apparatus for the motor vehicle seat of claim 1, wherein the front vibration levers are connected to each other through a first support cross arm and the rear vibration levers are connected to each other through a second support cross arm.

10. The under-frame apparatus for the motor vehicle seat of claim 1, wherein the rear vibration levers rotate from the starting position to the respective rotation directions till 75°.

* * * * *